(12) United States Patent
Langenecker et al.

(10) Patent No.: US 8,021,557 B2
(45) Date of Patent: Sep. 20, 2011

(54) METHOD FOR DESALINATION OF SEAWATER

(75) Inventors: Bertwin Langenecker, Moraga, CA (US); Christel E. Zeilinger, Moraga, CA (US)

(73) Assignee: Globe Protect, Inc., Danville, CA (US)

( * ) Notice: Subject to any disclaimer, the term of this patent is extended or adjusted under 35 U.S.C. 154(b) by 0 days.

(21) Appl. No.: 12/851,387

(22) Filed: Aug. 5, 2010

(65) Prior Publication Data

US 2010/0300973 A1 Dec. 2, 2010

Related U.S. Application Data

(62) Division of application No. 11/740,752, filed on Apr. 26, 2007, now Pat. No. 7,770,830.

(51) Int. Cl.
*C02F 1/42* (2006.01)
*C02F 1/36* (2006.01)

(52) U.S. Cl. .......... 210/748.01; 422/20; 241/39; 241/60

(58) Field of Classification Search .............. 210/748.01, 210/61, 663; 240/101.2; 241/60, 39, 69; 422/20

See application file for complete search history.

(56) References Cited

U.S. PATENT DOCUMENTS

| | | |
|---|---|---|
| 772,642 A | 10/1904 | Carr |
| 1,264,635 A | 4/1918 | Graham |
| 1,745,727 A | 2/1930 | Sterzl |
| 3,779,531 A | 12/1973 | White |
| 3,935,098 A | 1/1976 | Oda et al. |
| 4,191,335 A | 3/1980 | Cavagna |
| 4,220,529 A | 9/1980 | Daude-Lagrave |

(Continued)

FOREIGN PATENT DOCUMENTS

AT 202280 2/1959

(Continued)

OTHER PUBLICATIONS

Aono et al., Desalination Method for Seawater, Mixed Adsorbent and Desalination Device for Seawater Using the Adsorbent, Sep. 14, 2006, Japanese Patent office.(Machine Translations to English).*

(Continued)

*Primary Examiner* — Walter Griffin
*Assistant Examiner* — Cameron J Allen
(74) *Attorney, Agent, or Firm* — Blakely Sokoloff Taylor & Zafman LLP

(57) ABSTRACT

A method and an apparatus for the modification of seawater, brine, or alike, to render it suitable for irrigation, industrial use, or for further treatment in a drinking water purification plant, as well as to extract desired substances from brines, such as boron, and to clear waste from mining processes, by reducing environment endangering contaminants, like petroleum hydro-carbons, or radioactive substances, as well as inactivating microorganisms and virus in biosolids, by means of exposing the substances to high-intensity macrosound, i.e., alternating mechanical energy radiation at (ultra-) sonic frequencies. The treatment enhances the separation of salt, or/and other desired materials, from the water, and activates in situ the adsorption of the materials on sorbefacient substances supplied to the desalination process in form of dust of pulverized, liquefied, or vaporized substances, or by elements (of walls) of treatment chambers, or filters. The separation of the adsorption material together with the adsorbed salt, or/and any other extract from the liquid, is accomplished by common techniques, such as sedimentation, decanter, filter, or (electrostatic) separator.

9 Claims, 3 Drawing Sheets

U.S. PATENT DOCUMENTS

| | | | |
|---|---|---|---|
| 4,370,235 | A | 1/1983 | Suzuki et al. |
| 4,578,185 | A | 3/1986 | Wilson et al. |
| 4,923,125 | A | 5/1990 | Bateson et al. |
| 4,964,576 | A | 10/1990 | Datta |
| 5,167,375 | A | 12/1992 | Datta |
| 5,223,147 | A | 6/1993 | Rosenstock et al. |
| 5,244,159 | A | 9/1993 | Newman |
| 5,248,098 | A | 9/1993 | Schade |
| 5,316,223 | A | 5/1994 | Lahoda et al. |
| 5,338,337 | A | 8/1994 | Johnson et al. |
| 5,384,989 | A | 1/1995 | Shibano |
| 5,385,673 | A | 1/1995 | Fergen |
| 5,421,527 | A | 6/1995 | Corte |
| 5,422,015 | A | 6/1995 | Angell et al. |
| 5,482,216 | A | 1/1996 | Hess |
| 5,667,150 | A | 9/1997 | Arasmith et al. |
| 5,730,376 | A | 3/1998 | Schneid et al. |
| 5,829,691 | A | 11/1998 | Gaudin |
| 5,853,450 | A | 12/1998 | Burnham et al. |
| 6,076,752 | A | 6/2000 | Paradowski et al. |
| 6,082,548 | A | 7/2000 | Stephenson et al. |
| 6,123,483 | A | 9/2000 | Langenecker |
| 6,200,486 | B1 | 3/2001 | Chahine et al. |
| 6,311,905 | B1 | 11/2001 | Galanty et al. |
| 6,601,787 | B1 * | 8/2003 | Langenecker ............ 241/21 |
| 6,627,784 | B2 | 9/2003 | Hudson et al. |
| 6,651,914 | B1 | 11/2003 | Langenecker |
| 7,306,737 | B2 | 12/2007 | Langenecker |
| 7,770,830 | B1 | 8/2010 | Langenecker et al. |
| 2003/0192831 | A1 | 10/2003 | Langenecker |
| 2009/0050572 | A1 | 2/2009 | McGuire et al. |

FOREIGN PATENT DOCUMENTS

| | | |
|---|---|---|
| AT | 389889 | 2/1990 |
| DE | 3826896 | 2/1990 |
| DE | 3903684 | 8/1990 |
| EP | 0515686 | 12/1992 |
| EP | 1186338 | 3/2002 |
| JP | 8-103778 | 4/1996 |
| JP | 2006239482 A * | 9/2006 |
| RU | 2116264 | 7/1998 |
| UA | 65763 | 4/2004 |
| WO | WO-8602630 | 5/1986 |

OTHER PUBLICATIONS

Brown, J.C., et al. "Acoustic Cavitation: A Future Tool for Improving Public Health", Report, Nov. 2002 (4 pages).

Brown, J.C., et al., "Emerging Disinfection Technologies", Florida Water Resources Journal, Jul. 2006 (4 pages).

Laroussi, M., et al., "Plasma Interaction with Microbes", New Journal of Physics (2003) 5:41.1-41.10.

Globe Protect, Inc., International Search Report and Written Opinion dated Mar. 25, 2011 for PCT/US2010/044910.

* cited by examiner

METHOD FOR DESALINATION OF SEAWATER

CROSS-REFERENCE TO RELATED APPLICATION

The application is a division of co-pending U.S. patent application Ser. No. 11/740,752, filed Apr. 26, 2007 and incorporated herein by reference.

FIELD

An apparatus for modifying a liquid or solution such as desalinating saline water, such as seawater, brine, or alike, to render it suitable for irrigation, industrial use, or for further treatment in a drinking water purification plant, as well as to extract desired substances from brines, such as boron, and to clear waste from mining processes by reducing environment endangering contaminants, like petroleum hydrocarbons, as well as radioactive substances.

High-intensity acoustic radiation (macrosound) enhances the separation of salt, or any other desired substances from water, and activates, in situ, the adsorption of the substances onto sorbefacient materials (e.g., adsorbent material, sorbens), out of which elements (walls) of treatment chambers are made, or filters etc., or supplied to the desalination process in form of dust of pulverized, liquefied, or vaporized substances, preferentially lignite (coal), or lava (e.g., pumice or volcanic rocks), and alike. The separation of the sorbens together with the deposited salt, etc., on the sorbens from the water is accomplished by common techniques, such as sedimentation, decanter, filter, or (electrostatic) separation, etc.

BACKGROUND

Modern man's need for water is pressing. As the world's population has increased, so has the demand for water, especially for pure water, to safeguard public health. From 1900 to 1960 the demand for water in the United States increased six-fold. By the year 2001, the demand for water averaged 900,000,000,000 (billion) gallons per day. Next to homes and agriculture, industries are major users of water.

There are six different kinds of freshwater reserves, or sources. The four concentrated (or main) reserves are those in rivers, lakes, man-made reservoirs, and groundwater. The other two water reservoirs are found in the atmosphere and the soil. These sources are so difficult to tap that they are known as diffuse, or scattered reserves.

Water engineers are dealing, and have experimented with various methods, including converting salt water into fresh water. The principle methods researched, developed and so far put to limited use are distillation (or evaporation), electrodialysis, freezing, ion exchange, and reverse osmosis. A number of large desalination plants, some with capacities of 1,000,000 or more gallons per day, have been constructed in the United States. However, the use of such plants has been much more widespread outside the United States, especially in underdeveloped countries. None of these plants currently operate at reasonable costs.

The problem of adequate water supply has become more and more critical, since more human waste, as well as waste from agriculture and industries, pollute the world's freshwater resources, such as rivers, lakes, and groundwater. Some of the polluting (liquid) wastes can be treated by various technologies to become environmentally friendly, and thus preserving the water resources. The willingness of people to preserve nature by applying adequate technologies for treatment of waste, is confronted by considerable cost.

SUMMARY

The invention provides an apparatus and a method for the modification of a liquid or solution such as desalination of seawater, brine, and alike, for producing water for agriculture, industry and for processing potable water at reasonable cost. The invention also lends itself (with some adaptations of mechanical elements of the apparatus) to the extraction of radioactive contaminants (such as uranium), and is suitable for mining, such as for obtaining boron from brines, as well as for the treatment of polluted effluents from mining industries, thus serving the protection of the environment.

The method embraces modification of a liquid or solution such as desalination of seawater, brine, or alike, in a treatment chamber, where the impact of an intense field of alternating mechanical energy (macrosound) enhances the separation of the desired substances (such as salt, etc.) form the surrounding matter, and activates the adsorption of the desired substances in situ on selected adsorbent materials. The process takes place by spraying seawater, or any other liquids mentioned above, onto the sorbefacient materials, out of which elements (of walls) of the treatment chamber are made, of filters, etc., or supplied to the desalination process in form of dust (of pulverized, liquefied, or vaporized) substances.

In further processing, the sorbens, together with the adsorbed material, is separated from the liquid by (electrostatic) separation, or sedimentation, and/or in a decanter, (band) filter press, or an other common technique, and may be subjected to further treatment, or disposal. The separated liquids (water and/or brine) may be used as directed, and/or safely returned to nature. Other features and advantages of the invention will be apparent from the accompanying drawing and from the detailed description that follows below.

BRIEF DESCRIPTION OF THE DRAWING

The invention is illustrated by way of an example and not limited by the figure of the accompanying drawing.

DETAILED DESCRIPTION

The invention lends itself for modification of a liquid or solution such as desalination of saline water, etc., as well as for economical treatment of liquid waste, such as brine from mining of raw material for producing boron, soda ash, sodium sulfate, boric acid, etc. Efficacy and reality of the invented technology are completed by incorporating low-cost substances as sorbefacient or sorbent ingredients, e.g., lignite (coal), or lava (pumice), under the impact of alternating mechanical energy. Lava (pumice) erupted as molten rock on the earth surface by a volcano or through a fissure in the earth's surface. It is sometimes poured out over wide regions through great fissures in the earth's surface, as in the Columbia River plateau of the NW United States, where it is spread over 30,000 sq mi (77,700 sq km) and is up to 5,000 ft (1,524 m) deep. Other such regions are found in the Deccan plateau of India, in E-Brazil, in Iceland, and in Southern California (predominantly in the Indian Wells Valley). Lava is composed chiefly of silica and the oxides of aluminum, iron, magnesium, calcium, sodium, and potassium. Silica, with soda and potash, predominates in the light-colored, acid felsites; iron oxides, lime, and magnesia, in the dark-colored, basic basalts.

One embodiment of the invention relates to reducing the cost of desalination of water, as well as to reducing the cost of decontaminating the effluent from industry and mining operation. Contaminated effluents may contain (recoverable petroleum) hydrocarbons, formaldehyde, (heavy) metals, etc.

Figure 1:
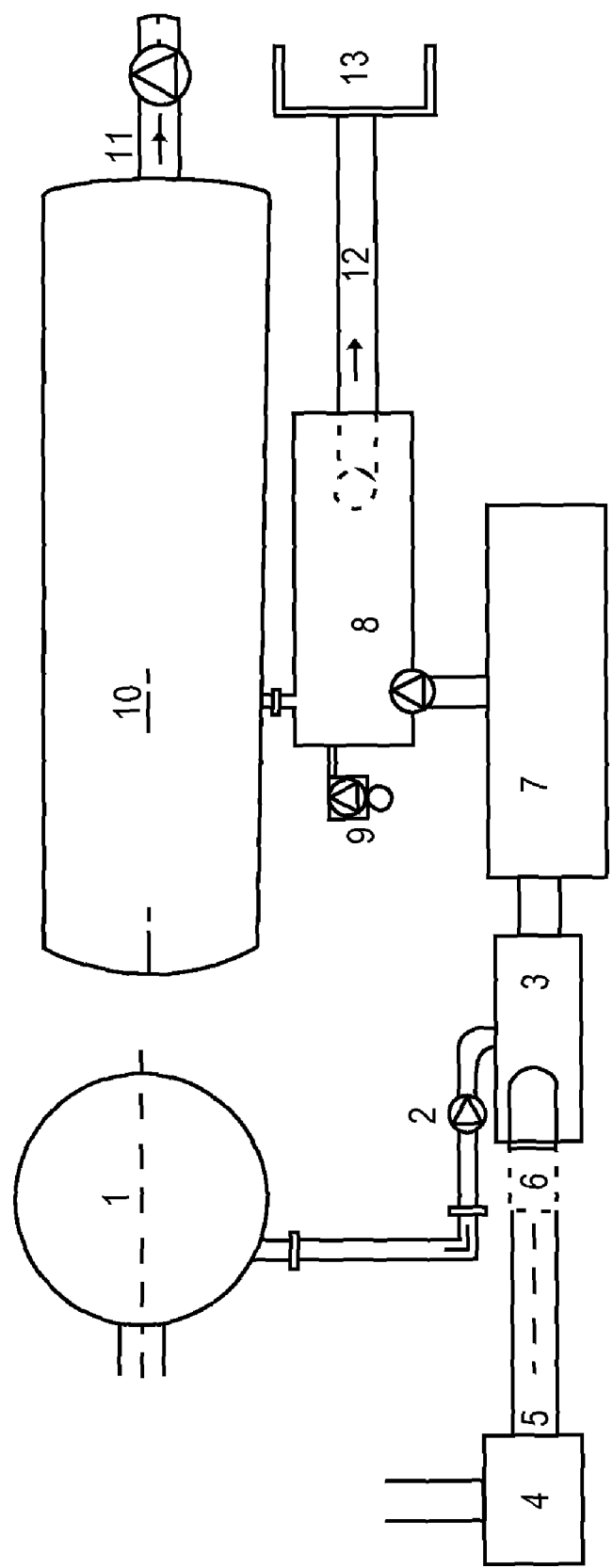
FIG. 1 is a schematic diagram illustrating an embodiment of a system suitable for desalination of seawater or other solution.

FIG. 1 is a block diagram illustrating an apparatus and system for the desalination of seawater in accordance with one embodiment. Desalination of seawater is one example and the apparatus or system may be used to treat other liquid (e.g., other water solutions). It should be understood that reducing hydrocarbon content in a brine of a mining operation may be done in the same apparatus at working parameters, which are adjusted to the physical and chemical properties of the matter to be treated.

Referring to FIG. 1, seawater, or any other liquid to be processed, is pumped from tank 1, by means of pump 2, to the treatment chamber 3. Simultaneously, a sorbent material, such as lignite (coal)), lava (volcanic rock), or pumice (igneous, extrusive volcanic rock) stored in granular consistency in staging area 4, is removed from staging area 4, and fed by means of screw or belt conveyor 5 (or alike), to treatment chamber 3. Alternatively, elements of treatment chamber 3 where a treatment is to occur (e.g., inside treatment chamber 3) are coated with a sorbent material (e.g., a solid phase sorbent material in a form of pulverized dust).

Along this progression, monitoring device 6 such as a flow meter (e.g., a bucket wheel flow meter) determines and measures the quantity (e.g., volume or amount) of sorbent material to be added and mixed intimately with the liquid to be processed. Chamber 3 includes in a housing, with an opening to receive the sorbent, an inlet for the seawater (or a liquid to be decontaminated), and an outlet for the treated substance (seawater, any other liquid, and contaminants). A representative amount of sorbent material is 0.1 percent to one percent of the quantity of liquid (e.g., seawater) to be treated depending, in part, on the degree of pollution.

Also within the housing of chamber 3 is a rotating comminuting grinder (pulverizer) and a stator. In chamber 3, the sorbent material is mixed intimately with the seawater, or other liquid to be treated. This mixture is agitated to produce intense turbulences that reduce the surface tension of the liquid and enhance the adsorption process. The grinding and mixing takes place under a superimposed high-energy, alternating mechanical field (i.e., high intensity macrosound) that can be achieved by means of beater disks, pin disks, vortex rotors, or any other suitable device.

Along this progression, monitoring device 6 determines and measures the quantity (e.g., volume or amount) of sorbent material to be added and mixed intimately with the liquid to be processed. Chamber 3 includes a housing, with an opening to receive the sorbent material, an inlet for the seawater (or a liquid to be decontaminated), and an outlet for the treated substance (seawater, any other liquid, and contaminants).

One skilled in the art will appreciate that exposing a liquid and an adsorptive substance (sorbent material) to an alternating mechanical field in situ may depend upon factors such as the distance of one beater, blade, or pin from another beater, blade or pin, or on a plurality of said machine elements. Additionally, the revolutions per minute (RPM) of a rotor (disk that holds the said elements) also affects the alternating mechanical field. Either of these factors may be adjusted in order to create the required alternating field. In one embodiment, alternating mechanical energy radiation at ultrasonic frequencies. One example of operating conditions utilizing a rotor and stator include a 40 centimeter (cm) diameter rotor positioned with pins extending from one side and directed at an opposing stator also with extending pins. The rotor and stator are separated from one another (pin tip to pin top) by two millimeters (mm) or less. The rotor rotates at a velocity on the order of 3800 revolutions per minute (rpm) or greater (e.g., 4000 rpm or greater).

After treatment, the treated materials may pass through a suitable conventional device for separation of the water from the sorbent material and its freight, i.e., the salt, or any other material desired, or of concern. A suitable device may include tank 7, where some or all of the solids sinks to the bottom of tank 7, by gravity. Other solids contained in the mixture leaving chamber 3 may be dehydrated in dewatering system 8, where it passes through an (electrostatic) separator, decanter, (filter) press, or the like. If electrolytes are needed to enhance the dehydration in dewatering system 8, tank 7 and pump 9 may provide such ingredients in adjustable and controllable dose. The majority of mass produced (desalinated water, etc.) leaving the treatment facility, can be stored/analyzed in tank 10, and released through valve 11, once confirmed to correspond with the applicable environment and health law and regulations. The dewatered solids, i.e., the sorbent material with the extracted freight (salt, etc.) are removed from the treatment assembly by screw or belt conveyer, or similar device 12, to storage or delivery exit 13.

Figure 2:
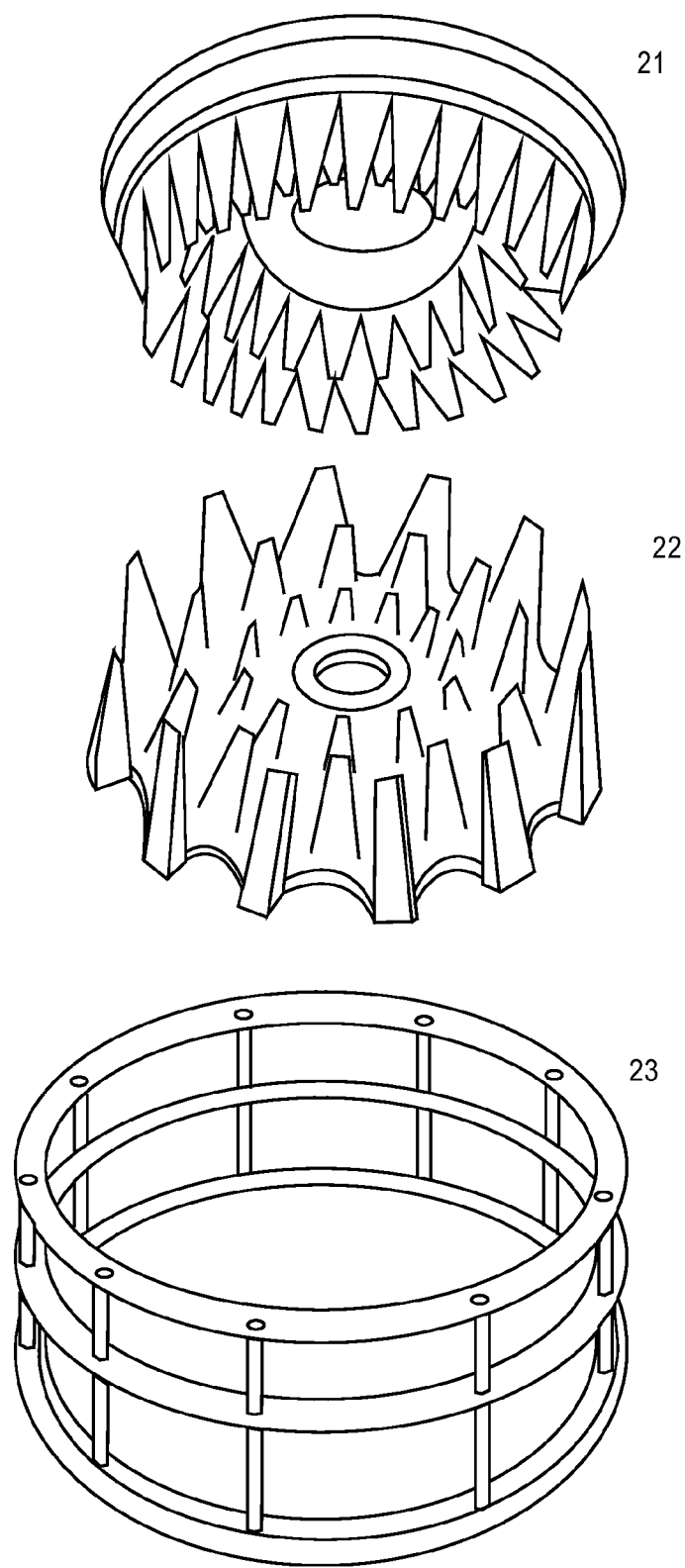
FIG. 2 is an exploded perspective view of beater disks of a comminuting grinder assembly suitable for use in a treatment chamber in the system of FIG. 1.

FIG. 2 is a perspective exploded view of beater disks, stator 21 and rotor 22, as well as sieve basket 23 for the use in a treatment apparatus or chamber (grinding and mixing assembly) of FIG. 1, that may be used in accordance with one embodiment of the invention, for example, in chamber 3. The beater disks grind the stock of lumps of sorbent material to a high degree of fineness, creating a dust of adsorbing substance. A row of clearing blades ensures that the sieve is kept clean, to guarantee maximum efficiency. The beater disks also disperse the seawater (and/or the liquid concerned), and spray it into the dust of sorbent material (or against walls made of sorbent substances), as described with FIG. 1 above.

Figure 3:
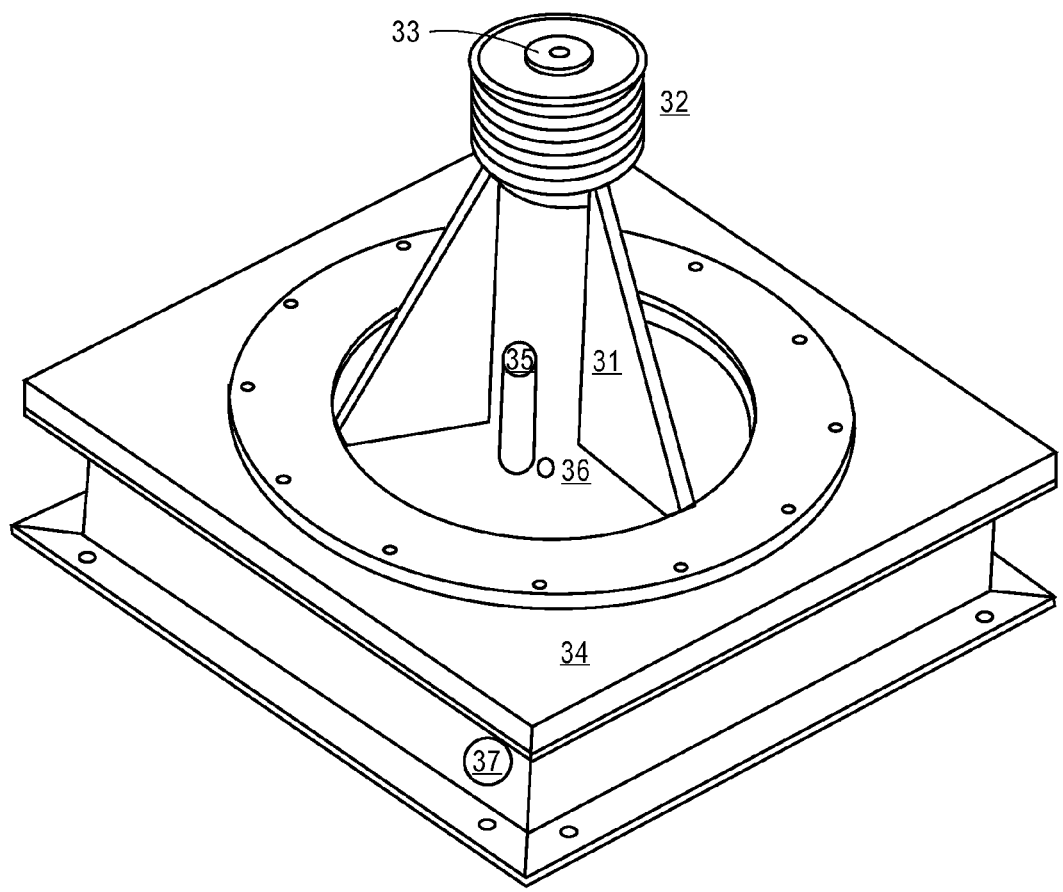
FIG. 3 is a schematic top perspective view of a rotor assembly of a comminuting grinder assembly and a treatment chamber suitable for use in the system of FIG. 1.

FIG. 3 is a schematic top perspective view of an embodiment of a rotor assembly connected to chamber 3. FIG. 3 shows frame 31 extending from chamber 3. Frame 31 contains shaft 33 which extends vertically from chamber 3. Pulley 32 is connected to one end of shaft 33 for a V-belt to connect to a motor (not shown) to rotate shaft 33. A second end of shaft 33 extends into chamber 3. A rotor, such as rotor 22 (shown in FIG. 2) is connected to the second end of shaft 33 inside of chamber 3. Input 35 for liquids (such as saline water), and input 36 for sorbent material; together with the output 37 provides the means for continuous operation of the treatment in the sense of the invention in hand.

Example

For illustration of the invention's economic treatment cost of saline water processing, it should be noted, that the prototype desalination apparatus may desalinate ~9,000 gallons per hour, with an electric power input of ~38 kWh*, corresponding to 4.2 kWh for 1,000 gal (≈1.1 kWh/t) seawater (*inclusive electric energy for the pump 5; see FIG. 2).

The sorbent material was pulverized lignite; the "rotor" of the prototype machine operated at 3870 rpm, equipped with 66 blades; the "stator" had 68 blades; the diameter of the "sieve" was 16.8 inches.

According to reports of other treatment technologies found in open literature, the energy consumption e.g., for reserve osmosis (RO) amounts to 26.7 kWh for 1,000 gal (≈7 kWh/t) seawater (3.7% salt content) for the production of potable water with salt content<500 ppm (single step), in large desalination plants (with pressure recovery for the electric power for pumps). Smaller plants (without pressure recovery) consume up to 119-150 kWh for 1,000 gal (≈30–40 kWh/t) seawater.

What is claimed is:

1. A method comprising:
   exposing a liquid and an adsorptive substance in situ to the impact of high-intensity macrosound in a chamber comprising a grinder disposed in a sieve;
   modifying the liquid; and
   after modifying, separating the modified liquid from the adsorptive substance.

2. The method of claim 1, wherein modifying comprises desalinating.

3. The method of claim 1, wherein modifying comprising rendering the liquid suitable for irrigation, industrial use, and for further treatment into potable water in a purification plant.

4. The method of claim 1, wherein the adsorptive substance comprises at least one of lignite (coal), a lava (volcanic rock), and a pumice (igneous, extrusive volcanic rock).

5. The method of claim 4, wherein the adsorptive substance comprises at least one of an element of the surrounding chamber, a solid phase, a liquefied phase, and a vaporized phase.

6. The method of claim 1, wherein modifying comprises rendering the liquid to a clean form to meet relevant laws.

7. The method of claim 1, wherein the liquid is contaminated by solids, such as heavy metals, including radioactive elements such as uranium, or/and liquids, such as petroleum, or/and pathogens, including virus.

8. The method of claim 1, wherein exposing the liquid and the adsorptive substance to high intensity macrosound comprises exposing to beater discs to create the alternating mechanical energy radiation.

9. The method of claim 1, wherein an element of the chamber is coated with the adsorptive substance.

* * * * *